(12) United States Patent
Wegerich et al.

(10) Patent No.: US 7,403,869 B2
(45) Date of Patent: Jul. 22, 2008

(54) SYSTEM STATE MONITORING USING RECURRENT LOCAL LEARNING MACHINE

(75) Inventors: Stephan W. Wegerich, Geneva, IL (US); Xiao Xu, Naperville, IL (US)

(73) Assignee: Smartsignal Corporation, Lisle, IL (US)

( * ) Notice: Subject to any disclaimer, the term of this patent is extended or adjusted under 35 U.S.C. 154(b) by 296 days.

(21) Appl. No.: 11/119,322

(22) Filed: Apr. 29, 2005

(65) Prior Publication Data

US 2005/0278143 A1    Dec. 15, 2005

Related U.S. Application Data

(63) Continuation of application No. PCT/US03/35001, filed on Nov. 3, 2003.

(60) Provisional application No. 60/423,476, filed on Nov. 4, 2002.

(51) Int. Cl.
*G06F 11/30* (2006.01)
(52) U.S. Cl. ....................................................... 702/183
(58) Field of Classification Search .................. 702/183
See application file for complete search history.

(56) References Cited

U.S. PATENT DOCUMENTS

| | | | |
|---|---|---|---|
| 4,215,412 A | 7/1980 | Bernier et al. | |
| 4,937,763 A | 6/1990 | Mott | |
| 5,764,509 A | 6/1998 | Gross et al. | |
| 5,987,399 A | 11/1999 | Wegerich et al. | |
| 6,108,616 A | 8/2000 | Borchers et al. | |
| 6,609,036 B1 * | 8/2003 | Bickford | 700/30 |
| 6,859,739 B2 | 2/2005 | Wegerich et al. | |
| 7,016,816 B2 * | 3/2006 | Mott | 702/196 |
| 7,233,886 B2 | 6/2007 | Wegerich et al. | |

FOREIGN PATENT DOCUMENTS

WO         WO 00/67412         11/2000

OTHER PUBLICATIONS

"Modelware a New Approach to Prediction" by Ken Tucker, Vendor's Forum, Jan./Feb. 1993 (pp. 14-15, 30).
"Empirical Models for Intelligent Data Validation" by T.J. Harris et al., Instrumentation, Controls, and Automation in the Power Industry; Proceedings of the . . . Power Instrumentation Symposium, Jun. 1992 vol. 35 (pp. 311-326).

* cited by examiner

*Primary Examiner*—John E Barlow, Jr.
*Assistant Examiner*—Lisa C. Sievers
(74) *Attorney, Agent, or Firm*—Fitch, Even, Tabin & Flannery

(57) ABSTRACT

Reference data observations for given system are used to develop a reference set of such observations. Subsequent observations (comprising, in one embodiment, current observations) are then used to facilitate selection of portions of this reference set to yield a resultant set of observations that serves as a model. This model can then be used in comparison to actual system performance to detect, for example, a trend towards a faulty condition. Pursuant to a preferred approach, the model is recomputed from time to time and, pursuant to a particular embodiment, is recomputed with each new set of current observations.

25 Claims, 3 Drawing Sheets

SYSTEM STATE MONITORING USING RECURRENT LOCAL LEARNING MACHINE

This is a continuation of prior International application number PCT/US2003/035001, filed Nov. 3, 2003, and claims the priority of U.S. Provisional application Ser. No. 60/423,476, filed Nov. 4, 2002, which is hereby incorporated herein by reference in its entirety.

FIELD OF THE INVENTION

The present invention relates to a method and system for modeling a process, piece of equipment or complex interrelated system. More particularly, it relates to equipment condition and health monitoring and process performance monitoring for early fault and deviation warning, based on recurrent non-parametric modeling and state estimation using exemplary data.

SUMMARY OF THE INVENTION

The present invention provides an empirical, non-parametric multivariate modeling method and apparatus for state modeling of a complex system such as equipment, processes or the like, and provides equipment health monitoring, process performance optimization, and state categorization. In a machine, process or other complex system that can be characterized by data from sensors or other measurements, the inventive modeling method comprises first acquiring reference data observations from the sensors or measurements representative of the machine, process or system, and then computing the model from a combination of the representative data with a current observation from the same sensors or measurements. The model is recomputed with each new observation of the modeled system. The output of the model is an estimate of at least one sensor, measurement or other classification or qualification parameter that characterizes the state of the modeled system.

Accordingly, for equipment health monitoring, the model provides estimates for one or more sensors on the equipment, which can be compared to the actually measured values of those sensors to detect a deviation indicative of an incipient failure mode. Alternatively, the model can estimate a performance parameter that can be used to optimize a process, by indicating how that performance parameter changes with controllable changes in inputs to the process. The estimate provided by the model can even by a logical or qualitative output designating the state of the modeled system, as in a quality control application or a disease classification medical application.

Advantageously, the modeling method employs similarity-based modeling, wherein the model estimate is comprised of a weighted composite of the most similar observations in the reference data to the current observation. The model employs matrix regularization to control against ill-conditioned outputs, e.g., estimates that blow up to enormous or unrealistic values, which are useless in the applications of the model. For applications in which the size of the reference data is large, or the sampling time of observations (and thus the need for estimates from the model) is fast, the current observation can be indexed into a subset domain or fuzzy subset of the reference data using a comparison of the current observation with a reference vector, for quicker computation of the estimate.

The inventive apparatus comprises a memory for storing the reference data; an input means such as a networked data bus or analog-to-digital converter connected directly to sensors, for receiving current observations; a processing unit for computing the model estimate responsive to the receipt of the current observation; and output means such as a graphic user interface for reporting the results of the modeling. The apparatus may further comprise a software module for outputting the model estimates to other software modules for taking action based on the estimates.

DETAILED DESCRIPTION OF THE PREFERRED EMBODIMENTS

The modeling method of the present invention can be used in equipment condition monitoring where the model estimates sensor readings in response to current readings, and the estimates and actual readings are compared to detect and diagnose any equipment health issues. The modeling method can also be extended for use in classification of a system characterized by observed variables or features, where the output of the model can be an estimate of a parameter used for classifying. Generally, the invention will be described with respect to equipment health monitoring.

A reference data set of observations from sensors or other variables of the modeled system comprises sufficient numbers of observations to characterize the modeled system through all of the dynamics of that system that are anticipated for purposes of the modeling. For example, in the case of monitoring a gas combustion turbine for equipment health and detection of incipient failures, it may be sufficient to obtain 500 to 10,000 observations from a set of 20-80 temperature, flow and pressure sensors on the turbine, throughout the operational range of the turbine, and throughout environmental changes (seasons) if the turbine is located outside. As another example of equipment health monitoring, 10-20 sensors on a jet engine can be used to obtain 50-100 observations of take-off or cruise-mode operation to provide adequate modeling. In the event that all such data is not available up front (for example, seasonally affected operation), the reference set can be augmented with current observations.

Observations may comprise both real-world sensor data and other types of measurements. Such measurements can include statistical data, such as network traffic statistics; demographic information; or biological cell counts, to name a few. Qualitative measurements can also be used, such as sampled opinions, subjective ratings, etc. All that is required of the input types used is that they are related in some fashion through the physics, mechanics, or dynamics of the system being modeled (or are suspected to be so), and in aggregate represent "states" the modeled system may take on.

Figure 1:
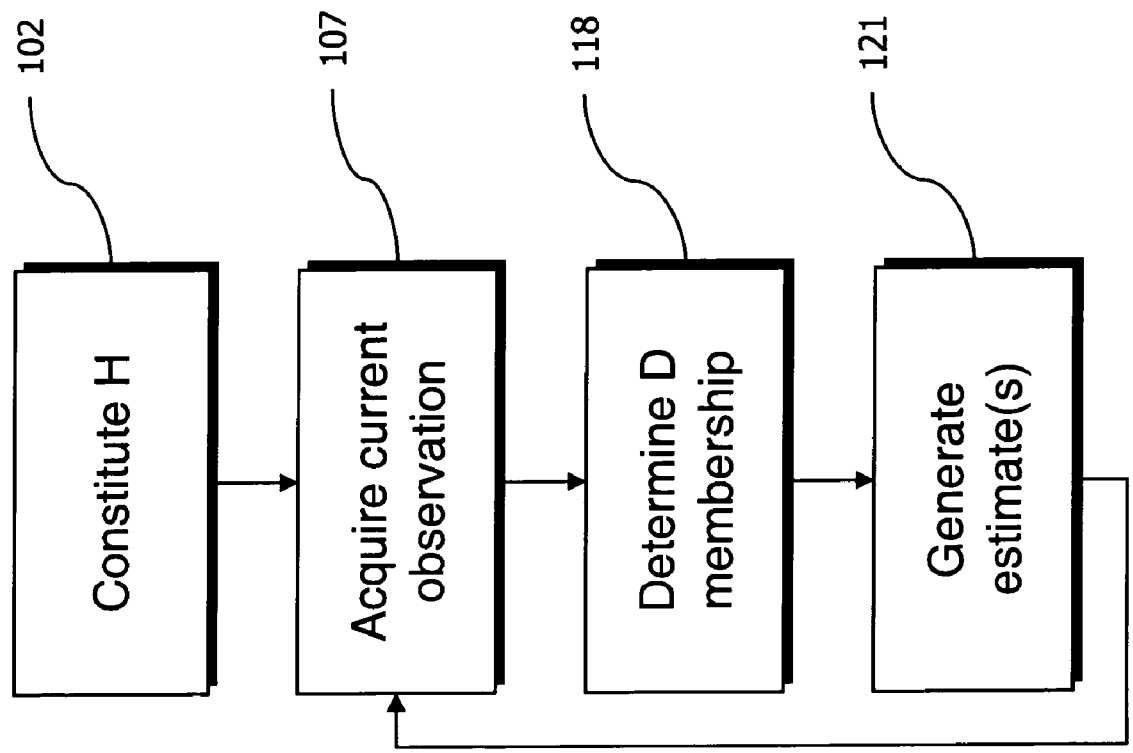
FIG. 1 is process flowchart for equipment health monitoring using the model of the invention.

With reference to FIG. 1, according to the invention, the reference set of observations is formed into a matrix, designated H for purposes hereof, in a step 102 typically with each column of the matrix representing an observation, and each row representing values from a single sensor or measurement. The ordering of the columns (i.e., observations) in the matrix is not important, and there is no element of causality or time progression inherent in the modeling method. The ordering of the rows is also not important, only that the rows are maintained in their correspondence to sensors throughout the modeling process, and readings from only one sensor appear on a given row. This step 102 occurs as part of the setup of the modeling system, and is not necessarily repeated during online operation.

After assembling a sufficiently characterizing set H of reference data observations for the modeled system, modeling can be carried out Modeling results in the generation of estimates in response to acquiring or inputting a real-time or current or test observation, as shown in step 107, which estimates can be estimates of sensors or non-sensor parameters of the modeled system, or estimates of classifications or qualifications distinctive of the state of the system. These estimates can be used for a variety of useful modeling purposes as described below.

The generation of estimates according to the inventive modeling method comprises two major steps after acquiring the input in 107. In the first step 118, the current observation is compared to the reference data H to determine a subset of reference observations from H having a particular relationship or affinity with the current observation, with which to constitute a smaller matrix, designated D for purposes hereof. In the second step 121, the D matrix is used to compute an estimate of at least one output parameter characteristic of the modeled system based on the current observation. Accordingly, it may be understood that the model estimate $Y_{est}$ is a function of the current input observation $Y_{in}$ and the current matrix D, derived from H:

$$\vec{Y}_{est} = \overline{D} \cdot \vec{W} \tag{1}$$

$$\vec{W} = \frac{\hat{W}}{\left(\sum_{j=1}^{N} \hat{W}(j)\right)} \tag{2}$$

$$\hat{W} = \left(\overline{D}^T \otimes \overline{D}\right)^{-1} \cdot \left(\overline{D}^T \otimes \vec{Y}_{in}\right) \tag{3}$$

$$\overline{D} = F\left(\overline{H}, \vec{Y}_{in}\right) \tag{4}$$

where the vector $Y_{est}$ of estimated values for the sensors is equal to the contributions from each of the snapshots of contemporaneous sensor values arranged to comprise matrix D. These contributions are determined by weight vector W. The multiplication operation is the standard matrix/vector multiplication operator, or inner product The similarity operator is symbolized in Equation 3, above, as the circle with the "X" disposed therein. Both the similarity operation of Equation 3 and the determination F of membership comprising D from H and the input observation $Y_{in}$ are discussed below.

As stated above, the symbol $\otimes$ represents the "similarity" operator, and could potentially be chosen from a variety of operators. In the context of the invention, this symbol should not to be confused with the normal meaning of designation of $\otimes$, which is something else. In other words, for purposes of the present invention the meaning of is that of a "similarity" operation.

The similarity operator, $\otimes$, works much as regular matrix multiplication operations, on a row-to-column basis, and results in a matrix having as many rows as the first operand and as many columns as the second operand. The similarity operation yields a scalar value for each combination of a row from the first operand and column from the second operand. One similarity operation that has been described above involves taking the ratio of corresponding elements of a row vector from the first operand and a column vector of the second operand, and inverting ratios greater than one, and averaging all the ratios, which for normalized and positive elements always yields a row/column similarity value between zero (very different) and one (identical). Hence, if the values are identical, the similarity is equal to one, and if the values are grossly unequal, the similarity approaches zero.

Another example of a similarity operator that can be used determines an elemental similarity between two corresponding elements of two observation vectors or snapshots, by subtracting from one a quantity with the absolute difference of the two elements in the numerator, and the expected range for the elements in the denominator. The expected range can be determined, for example, by the difference of the maximum and minimum values for that element to be found across all the data of the reference library 11 The vector similarity is then determined by averaging the elemental similarities.

In yet another similarity operator that can be used in the present invention, the vector similarity of two observation vectors is equal to the inverse of the quantity of one plus the magnitude Euclidean distance between the two vectors in n-dimensional space, where n is the number of elements in each observation, that is, the number of sensors being observed. Thus, the similarity reaches a highest value of one when the vectors are identical and are separated by zero distance, and diminishes as the vectors become increasingly distant (different).

Other similarity operators are known or may become known to those skilled in the art, and can be employed in the present invention as described herein. The recitation of the above operators is exemplary and not meant to limit the scope of the invention. In general, the following guidelines help to define a similarity operator for use in the invention as in equation 3 above and elsewhere described herein, but are not meant to limit the scope of the invention:

1. Similarity is a scalar range, bounded at each end.
2. The similarity of two identical inputs is the value of one of the bounded ends.
3. The absolute value of the similarity increases as the two inputs approach being identical.

Accordingly, for example, an effective similarity operator for use in the present invention can generate a similarity of ten (10) when the inputs are identical, and a similarity that diminishes toward zero as the inputs become more different. Alternatively, a bias or translation can be used, so that the similarity is 12 for identical inputs, and diminishes toward 2 as the inputs become more different Further, a scaling can be used, so that the similarity is 100 for identical inputs, and diminishes toward zero with increasing difference. Moreover, the scaling factor can also be a negative number, so that the similarity for identical inputs is −100 and approaches zero from the negative side with increasing difference of the inputs. The similarity can be rendered for the elements of two vectors being compared, and summed or otherwise statistically combined to yield an overall vector-to-vector similarity, or the similarity operator can operate on the vectors themselves (as in Euclidean distance).

Significantly, the present invention can be used for monitoring variables in an autoassociative mode or an inferential mode. In the autoassociative mode, model estimates are made of variables that also comprise inputs to the model. In the inferential mode, model estimates are made of variables that are not present in the input to the model. In the inferential mode, Equation 1 above becomes:

$$\vec{Y}_{est} = \vec{D}_{out} \cdot \vec{W} \tag{5}$$

and Equation 3 above becomes:

$$\hat{W} = (\overline{D}_{in}{}^T \otimes \overline{D}_{in})^{-1} \cdot (\overline{D}_{in}{}^T \otimes \vec{Y}_{in}) \qquad (6)$$

where the D matrix has been separated into two matrices $D_{in}$ and $D_{out}$, according to which rows are inputs and which rows are outputs, but column (observation) correspondence is maintained.

A key aspect of the present invention is that D is determined recurrently with each new input observation, from the superset of available learned observations H characterizing the dynamic behavior of the modeled system. In doing so, sufficiently relevant exemplars or learned observations are used to characterize the modeled behavior in the neighborhood of the current observation, but the model avoids both undue overfitting as well as impractical computational time. The determination of membership in D according to the invention is accomplished by relating the current input observation to observations in H, and when there is a sufficient relationship, that learned observation from H is included in D, otherwise it is not included in D for purposes of processing the current input observation.

According to one embodiment of the invention, the input observation is compared to exemplars in H using the similarity operation to render a similarity score for each such comparison, called "global similarity" for purposes hereof. If the resulting global similarity is above a certain threshold, or is one of the x highest such global similarities across all exemplars in H, the exemplar or learned observation is included in D. For a similarity operator rendering similarity scores between zero (different) and one (identical), a typical threshold may be 0.90 or above, by way of example. However, the choice of threshold will depend on the nature of the application, and especially on the number of exemplars in the set H. In the event that the highest x similarities are used to determine membership in D, it is not uncommon to use somewhere in the range of 5 to 50 exemplars in D, even when selecting from a set H that may have an enormous number of exemplars, such as 100,000. A hybrid of threshold and count can be used to determine membership of D, for example by using a threshold for inclusion, but requiring that D contain no less than 5 exemplars and no more than 25.

Importantly, not all elements of the observations need be used for determining global similarity. Certain variables or sensors may be deemed more dominant in the physics of the monitored system, and may be the basis for determining membership of D, by performing the global similarity calculation only on a subvector comprised the those elements from each of the current observation and each learned observation. By way of example, in an inferential model, in which the input observation has ten (10) sensor values, and the output of the model is an estimate for five (5) additional sensor values not among the inputs, the global similarity may be computed using a subvector of the input vector and the learned observations comprising only the 1st, $2^{nd}$, $5^{th}$, and $7^{th}$ sensor values, even though the estimate of the 5 outputs will be performed using all 10 inputs. Selection of which input sensors to rely on in determining global similarity for constituting membership in the D matrix can be made using domain knowledge, or can be determined from the least root mean square error between actual values and estimates produced by the model when tested against a set of test data (not part of the set H) characterizing normal system behavior, among other methods.

In an alternative to the use of the global similarity, membership in D can be determined by examining one or more variables at an elemental level, and including exemplars from H that have elemental values fitting a range or fitting some other criterion for one or more elements. For example, in the fanciful 10-input, 5-output model mentioned above, D might be comprised by exemplars from H with the 5 closest values for the $1^{st}$ sensor to the same sensor value for the current observation, the 5 closest value for the $2^{nd}$ sensor, the 5 closest for the $5^{th}$ sensor, and the 5 closest for the $7^{th}$ sensor, such that D has at most 20 vectors from H (though possibly less if some repeat). Note that this is different from the global similarity in that a learned observation may be included in D solely because it has a closely matching value on an mth sensor, irrespective of the rest of its sensor values.

In a preferred embodiment, the examination at an elemental level for membership in D can be performed on variables that do not in fact comprise inputs to the model, but are nonetheless sensor values or measurements available from the system with each observation of the other sensors in the model. A particularly important circumstance when this can be useful is with ambient condition variables, such as ambient air temperature, or ambient barometric pressure. Such ambient variables—while not necessarily serving as inputs to any given model—may be proxies for overall conditions that impact the interrelationships of the other sensor values that are in the model. Consequently, the use of ambient variables for determining membership in D of exemplars selected from H can be a good way of providing a D matrix with relevant exemplars to seasonal variation For example, in an application for monitoring the health of the engine of a locomotive, a variety of engine parameters (e.g., fuel flow, exhaust gas temperature, turbo pressure, etc.) may be used to model the behavior of the engine, and ambient temperature may be used as an ambient variable for selecting observations from H for D. The ambient temperature is a proxy for the weather conditions that affect how all the other parameters may interrelate at any given temperature. H ideally contains historic data of normal performance of the engine, for all temperature ranges, from below freezing in winter, to sweltering temperatures of a desert summer. Exemplars from H (coming from all across this temperature range) may be selected for a particular D matrix if the ambient temperature of the exemplar is one of the x closest values to the ambient temperature of the current input reading. Note that in computing the model estimates per equations 1-4 above, ambient temperature would not necessarily be an input or an output.

In a preferred embodiment, a hybrid of the ambient variable data selection and one of either global similarity or elemental test for inclusion, is used in combination Thus, for example, ambient temperature may be used to select from a superset of H having 100,000 learned observations covering temperatures from well below freezing to over 100 degrees Fahrenheit, a subset of 4000 observations to comprise an intermediate set H', which 4000 observations are those within +/−5 degrees from the current ambient temperature. This intermediate subset H' can then be used without alteration for several hours worth of input data (during which ambient temperature has not shifted significantly), to repeatedly generate a D matrix of, say, 30 vectors selected from the 4000 by means of global similarity for each input observation. In this way, the current observation can be closely modeled based on the performance characteristics of the system at that moment, within the framework of a set of data selected to match the ambient conditions. This cuts down on computational time (avoiding processing all 100,000 observations in H), avoids overfitting, and provides high fidelity modeling tuned to the conditions in which the monitored equipment is encountered.

Yet another way of determining membership in D involves a modified use of global similarity, for improving the computational speed of this step. Accordingly, a reference vector, which may be one of the exemplars in H, is first compared to all the learned observations to generate a global similarity for each comparison. This can be done before on-line monitoring is commenced, and need be done only once, up front Then, during monitoring the current observation is compared to that reference vector using global similarity, instead of comparing the current observation to all learned observations in H. The resulting global similarity score is then compared to the pre-calculated global similarities of the reference vector vis-à-vis the learned observations in H, and the closest n scores indicate the learned observations to include in D; or alternatively, those global similarities within certain limits around the global similarity of the current observation, indicate the learned observations to include in D.

According to yet another way to determine membership in D, the reference set of learned observations in H are grouped using a clustering method into a finite number of clusters. In real-time, the current observation is then analyzed to determine which cluster it belongs to, and the learned observations in that duster are then drawn from to constitute the D matrix. All of the learned observations in the cluster can be included, or a sampled subset of them can be included in order to keep the size of D manageable if the cluster contains too many vectors. The subset can be sampled randomly, or can be sampled from using a "characterized" sampling method as disclosed later herein.

To select the dusters for the clustering algorithm, seed vectors can be selected from H. A vector becomes a seed for a cluster based on containing a maximum or minimum value for a sensor across all the values of that sensor in H. One clustering technique that can be used is fuzzy C means clustering, which was derived from Hard C-Means (HCM). Accordingly, vectors in H can have partial membership in more than one cluster. Fuzzy C-Means (FCM) clustering minimizes the objective function:

$$J_m(U, V) = \sum_{k=1}^{n} \sum_{i=1}^{c} u_{ik}^m d^2(x_k, v_i) \quad (7)$$

where $X=(x_1, x_2, \ldots, x_n)$ is n data sample vectors (the learned observations in H), U is a partition of X in c part, $V=(v_1, v_2, \ldots, v_c)$ are duster centers in $R^v$ (seeded as mentioned above from actual observations in H), $u_{ik}$ is referred to as the grade of membership of $x_k$ to the cluster i, in this case the member of $u_{ik}$ is 0 or 1, and $d^2(x_k, v_i)$ is an inner product induced norm on $R^v$:

$$d(x_k, v_i) = \sqrt{(x_k - v_1)^T (x_k - v_i)} \quad (8)$$

The problem is to determine the appropriate membership $u_{ik}$, which is done through iterative determination to convergence of:

$$v_i = \frac{\sum_{j=1}^{n} u_{ij}^m x_j}{\sum_{j=1}^{n} u_{ij}^m} \quad (9)$$

-continued $$u_{ij} = \frac{1}{\sum_{k=1}^{c} \left(\frac{d_{ij}}{d_{kj}}\right)^{2/(m-1)}} \quad (10)$$

where c is the number of clusters. The $u_{ik}$ are randomly selected initially subject to the constraints:

$$0 \leq u_{ik} \leq 1, \text{ for } 1 \leq i \leq c, 1 \leq k \leq n \quad (11)$$

$$0 < \sum_{k=1}^{n} u_{ik} < n, \text{ for } 1 \leq i \leq c \quad (12)$$

$$\sum_{i=1}^{c} u_{ik} = 1, \text{ for } 1 \leq k \leq n \quad (13)$$

During monitoring, the input observation is compared using global similarity, Euclidean distance, or the like, to the cluster centers $v_i$, to determine which cluster the input observation is most related to. The D matrix is then constituted from the identified duster. A duster is determined to be those vectors in H that have a fuzzy membership $u_{ik}$ that is above a certain threshold, typically 0.70 (but dependent on the application and availability of data in H). Thus, a particular observation in H could belong to more than one duster. The duster in H matching the input observation can be used in its entirety for D, or can be selected from to comprise D, using any of the other methods described herein. Fuzzy c-means clustering can thus be used to reduce the number of vectors in H that need to be analyzed with some other method for inclusion in D, such as global similarity, as a computational savings.

An additional important aspect of the invention is adaptation of the model. Especially for equipment health monitoring (but also for other applications) the issue of keeping the model tuned with slow and acceptable changes to the underlying modeled system is critical for practical use. When monitoring equipment, graceful aging is assumed, and should not become a source of health alerts. Therefore the model must adapt through time to gradual aging and settling of the monitored equipment and not generate results that suggest an actionable fault is being detected.

Adaptation can be accomplished in the present invention in a number of ways. According to a first way, called for purposes herein "out-of-range" adaptation, certain of the monitored variables of the system are considered drivers or independent variables, and when they take on values outside of the ranges heretofore seen in the set H of exemplars, then the current observation is not alerted on, but rather is added to the set H, either by addition or by substitution. In this way, when a driver variable goes to a new high or a new low, the model incorporates the observation as part of normal modeled behavior, rather than generating an estimate that in all likelihood is different from the current observation. The drawback of this out-of-range adaptation is two-fold: (1) not all variables can be considered drivers and thus cause out-of-range adaptation and thus there is an application-specific art to determining which variables to use; and (2) there exists the possibility that an out-of-range event is in fact initial evidence of an incipient fault, and the model may now not as easily identify the fault With regard to the first concern, ambient variables can usually make good candidates for out-of-range adaptation as a rule. For the second concern, a preferred embodiment of the invention does not permit n successive out-of-range adaptations, where n is typically in the range of 2 and up, depending on the sampling rate of the data acquisition.

Usually, out-of-range adaptation is additive to the H matrix, rather than replacing exemplars in H. According to another kind of adaptation that can be employed in parallel with out-of-range adaptation, vectors are added to H that occur in a window of observations delayed by some offset from the current observation, and these additions replace the oldest exemplars in R Thus H is a first-in, first-out stack, and is eventually turned over entirely with updated observations, thus tracking the graceful aging of the monitored equipment The offset is required so that observations aren't learned that include developing faults, and the choice of delay size is largely a function of the application, the data sampling rate, and the nature of expected failures and how they manifest themselves.

Figure 2:
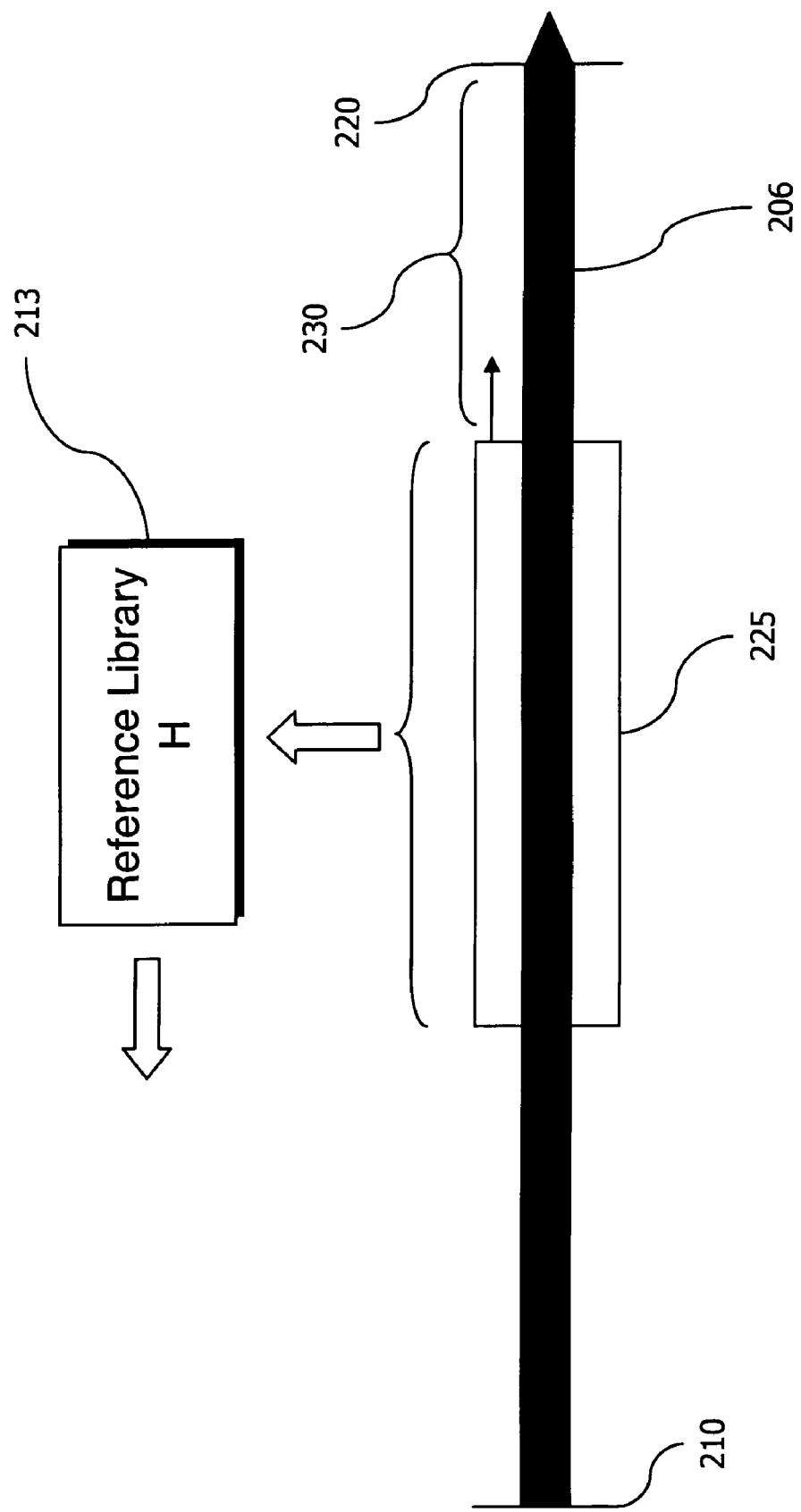
FIG. 2 shows a diagram for windowed adaptation in a model according to the invention.

Turning to FIG. 2, this method of moving window adaptation can be better understood in view of a timeline 206 of sequential current observations being monitored. Monitoring begins at time step 210. A reference library H of learned observations 213 has been assembled from prior normal operation of the monitored equipment The current real-time observation 220 is being monitored presently. A window of past observations 225 is drawn from to provide updated exemplars to reference library H 213, which may or may not employ a replacement scheme by which older exemplars are deleted from the library 213. The window 225 moves forward with the timeline 206, at some delay separation 230 from the current observation 220. If faults are detected in observations that enter the leading edge of window 225, there are two alternatives for avoiding adapting into the developing fault First, the faulted observations themselves can be flagged to not be adapted on. Second, windowed adaptation can be turned off until the fault is resolved. Upon resolution of the fault, the window would be reinitiated starting with "normal" data beyond (in time) the fault resolution event The observations in window 225 can be sampled for addition to library 213, or can all be added. Methods for sampling a subset of observations to add to library 213 include random sampling; periodic sampling; and "characterized" sampling, in which the set of observations in window 225 is mined for those observations that characterize the dynamics of operation throughout the window. For example, one way is to pick those observations which contain a highest value or a lowest value for any one of the sensors in the observations throughout the window, optionally augmented with observations having sensor values that cover the sensor range (as seen throughout the window) at equally spaced values (e.g., for a temperature range of 50-100 degrees, picking vectors at 60, 70, 80 and 90, as well as the extremes of 50 and 100).

Figure 3:
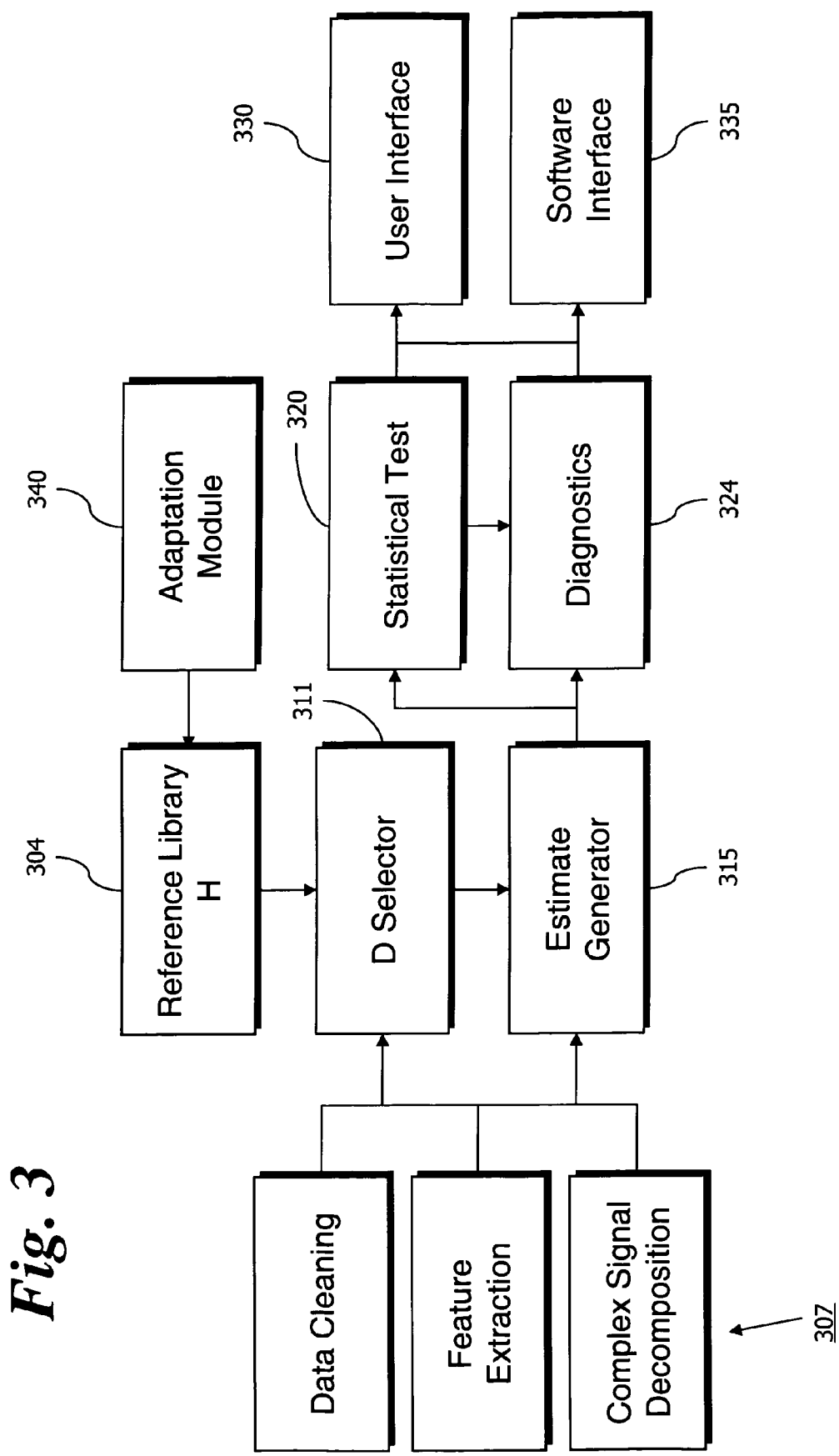
FIG. 3 shows a block diagram of a system according to the invention for monitoring equipment health.

Turning to FIG. 3, the use of the modeling of the present invention is described in the context of a complete apparatus for performing equipment health monitoring. An H reference library 304 is stored in memory, typically permanent disk drive read/write memory, and comprises learned observations characterizing the anticipated operational dynamics of the monitored equipment in normal, non-faulted operation. Data acquired or supplied from sensors or other measurement systems on the equipment are provided for active monitoring to a set of preconditioning modules 307, including data cleaning, feature extraction and complex signal decomposition Data cleaning includes filtering for spikes, smoothing with filters or splines, and other techniques known in the art Feature extraction can include spectral feature extraction, and translation of analog data values into classes or other numeric symbols, as is known in the art For sensors such as acoustics and vibration, complex signal decomposition is a form of feature extraction in which pseudo-sensors are provided from the spectral features of these complex signals, and can be FIT components as signals, or subbands.

The preconditioned data is then supplied to the D selector module 311 and the estimate generator 315. The D selector module 311 employs the techniques mentioned above to compare the (preconditioned) current observation to the exemplars in the library 304, to select a subset to comprise the D matrix. The estimate generator uses the D matrix and the current observation to generate an estimate for sensors describing equipment health according to Equations 1 through 4 above. Estimates are provided along with the current observation to a statistical testing module 320 which is described below. The purpose of the statistical testing module is to test the estimate in contrast to the actual current readings to detect incipience of faults in the equipment The estimated sensor values or parameters are compared using a decision technique to the actual sensor values or parameters that were received from the monitored process or machine. Such a comparison has the purpose of providing an indication of a discrepancy between the actual values and the expected values that characterize the operational state of the process or machine. Such discrepancies are indicators of sensor failure, incipient process upset, drift from optimal process targets, incipient mechanical failure, and so on.

The estimates and current readings are also available to a diagnostics module 324, as are the results of the statistical testing module. The diagnostics module 324 can comprise a rules-based processor for detecting patterns of behavior characteristic of particular known failure modes, by mapping combinations of residuals, statistical test alerts, raw values and features of raw values to these known failure modes. This is described in greater detail below.

The results of both the statistical testing module 320 and the diagnostics module 324 are made available to a user interface module 330, which in a preferred embodiment is a web-based graphical interface which can be remotely located, and which displays both failure messages and confidence levels generated by the diagnostics module 324, and charts of residuals, statistical testing alerts, and raw values. Diagnostic results and statistical test results can also be made available through a software interface 335 to downstream software that may use the information, e.g., for scheduling maintenance actions and the like. The software interface 335 in a preferred embodiment comprises a messaging service that can either be polled or pushes information to subscribing systems, such as .NET services.

An adaptation module 340 employs the out-of-range adaptation and the windowed adaptation described above to update the library 304 as frequently as with every new current observation.

The statistical testing module can employ a number of tests for determining an alert condition on the current observation or sequence of recent observations. One test that can be used is a simple threshold on the residual, which is the difference between the estimate of a sensor value and the actual sensor value (or actual preconditioned sensor value) from the current observation Alerts can be set for exceeding both a positive and/or a negative threshold on such a residual. The thresholds can be fixed (e.g., +/−10 degrees) or can be set as a multiple of the standard deviation on a moving window of the past n residuals, or the like.

Another test or decision technique that can be employed is called a sequential probability ratio test (SPRT), and is described in the aforementioned U.S. Pat. No. 5,764,509 to Gross et al. Broadly, for a sequence of estimates for a particular sensor, the test is capable of determining with preselected missed and false alarm rates whether the estimates and actuals are statistically the same or different, that is, belong to the same or to two different Gaussian distributions.

The SPRT type of test is based on the maximum likelihood ratio. The test sequentially samples a process at discrete times until it is capable of deciding between two alternatives: H0:μ=0; and H1:μ=M. In other words, is the sequence of sampled values indicative of a distribution around zero, or indicative of a distribution around some non-zero value? It has been demonstrated that the following approach provides an optimal decision method (the average sample size is less than a comparable fixed sample test). A test statistic, Ψt, is computed from the following formula:

$$\Psi_t = \sum_{i=1+j}^{t} \ln\left[\frac{f_{H1}(y_i)}{f_{H0}(y_i)}\right] \quad (14)$$

where ln( ) is the natural logarithm, $f_{Hs}()$ is the probability density function of the observed value of the random variable $Y_i$ under the hypothesis $H_s$ and j is the time point of the last decision.

In deciding between two alternative hypotheses, without knowing the true state of the signal under surveillance, it is possible to make an error (incorrect hypothesis decision). Two types of errors are possible. Rejecting $H_0$ when it is true (type I error) or accepting $H_0$ when it is false (type II error). Preferably these errors are controlled at some arbitrary minimum value, if possible. So, the probability of a false alarm or making a type I error is termed α, and the probability of missing an alarm or making a type II error is termed β. The well-known Wald's Approximation defines a lower bound, L, below which one accepts $H_0$ and an upper bound, U above which one rejects $H_0$.

$$U = \ln\left[\frac{1-\beta}{\alpha}\right] \quad (15)$$

$$L = \ln\left[\frac{\beta}{1-\alpha}\right] \quad (16)$$

Decision Rule: if $\Psi_t \leq L$, then ACCEPT $H_0$; else if $\Psi_t \geq U$, then REJECT $H_0$; otherwise, continue sampling.

To implement this procedure, this distribution of the process must be known This is not a problem in general, because some a priori information about the system exists. For most purposes, the multivariate Gaussian distribution is satisfactory, and the SPRT test can be simplified by assuming a Gaussian probability distribution p:

$$p = \frac{1}{\sigma\sqrt{2\pi}} e^{\left[-\frac{(x-\mu)^2}{2\sigma^2}\right]} \quad (17)$$

Then, the test statistic a typical sequential test deciding between zero-mean hypothesis $H_0$ and a positive mean hypothesis $H_1$ is:

$$\Psi_{t+1} = \Psi_t + \frac{M}{\sigma^2}\left(y_t - \frac{M}{2}\right) \quad (18)$$

where M is the hypothesized mean (typically set at a standard deviation away from zero, as given by the variance), σ is the variance of the training residual data and $y_t$ is the input value being tested. Then the decision can be made at any observation t+1 in the sequence according to:

1. If $\Psi_{t+1} \leq \ln(\beta/(1-\alpha))$, then accept hypothesis $H_0$ as true;
2. If $\Psi_{t-1} \geq \ln((1-\beta)/\alpha)$, then accept hypothesis H1 as true; and
3. If $\ln(\beta/(1-\alpha)) < \Psi_{t+1} < \ln((1-\beta)/\alpha)$, then make no decision and continue sampling.

The SPRT test can run against the residual for each monitored parameter, and can be tested against a positive biased mean, a negative biased mean, and against other statistical moments, such as the variance in the residual.

Other statistical decision techniques can be used in place of SPRT to determine whether the remotely monitored process or machine is operating in an abnormal way that indicates an incipient fault According to another technique, the estimated sensor data and the actual sensor data can be compared using the similarity operator to obtain a vector similarity. If the vector similarity falls below a selected threshold, an alert can be indicated and action taken to notify an interested party as mentioned above that an abnormal condition has been monitored.

It should be appreciated that a wide range of changes and modifications may be made to the embodiments of the invention as described herein. Thus, it is intended that the foregoing detailed description be regarded as illustrative rather than limiting.

What is claimed is:

1. A method for monitoring a system instrumented with one or more sensors that measure a plurality of variables characterizing performance of the system, said system having at least one additional varying parameter descriptive of its circumstances, comprising the steps of:

acquiring a current observation of the plurality of variables;

generating an estimate of an expected value for at least one of said plurality of variables;

comparing at least one said estimate to its corresponding measured variable; and storing in computer-readable form in a memory device an indication of the performance of said system based at least in part on a result of the comparing step;

wherein said step of generating an estimate comprises:

providing a reference set of observations characteristic of expected performance of said system, each such reference set observation comprising at least a subset of the plurality of variables, and each such reference set observation further being associated with a value of the at least one additional varying parameter;

providing a measure of the at least one additional varying parameter relating to the acquired current observation;

selecting from said reference set a subset of observations that have an associated value of the at least one additional varying parameter sufficiently close to the measure of the at least one additional parameter relating to the acquired current observation;

forming a model set of observations from the selected subset of observations;

computing said estimate using the acquired current observation and the model set of observations in a similarity-based model; and repeating these steps for generating an estimate for at least some of subsequently acquired current observations.

2. A method according to claim 1 wherein said step of computing said estimate in a similarity based-model utilizes a similarity operation wherein like elements of two observations are differenced, the absolute value of the difference is divided by an expected range for the element, and the resulting quantity is subtracted from 1; and the similarity of the two observations is determined as the average of all such similarities determined for elements of the two observations.

3. A method according to claim 1 wherein said step of computing said estimate in a similarity based-model utilizes a similarity operation wherein the norm of the difference of two observations is added to 1; and the result thereof is inverted.

4. A method according to claim 1 wherein said step of selecting from said reference set a subset of observations comprises selecting a predetermined number of reference set observations that have an associated value of the at least one additional varying parameter closest to the measure of the at least one additional parameter relating to the acquired current observation.

5. A method according to claim 1 wherein said step of selecting from said reference set a subset of observations comprises selecting those reference set observations that have an associated value of the at least one additional varying parameter lying within a predetermined range of the measure of the at least one additional parameter relating to the acquired current observation.

6. A method according to claim 1 wherein said step of forming a model set of observations from the selected subset of observations further comprises choosing a smaller subset of the selected subset of observations that have sufficient similarity to the acquired current observation, and forming the model set from the smaller subset.

7. A method according to claim 1 wherein said step of computing said estimate in a similarity based-model comprises using as input to the similarity-based model a modified form of the acquired current observation wherein an element corresponding to at least one of the plurality of variables is removed, and the removed variable is estimated by the similarity-based model.

8. A method according to claim 1 wherein said step of comparing at least one said estimate to its corresponding measured variable comprises differencing the estimate and its corresponding measured variable to generate a residual that is compared to a threshold for a determination at least in part of the presence of a fault in the performance of said system.

9. A method according to claim 1 wherein said step of comparing at least one said estimate to its corresponding measured variable comprises differencing the estimate and its corresponding measured variable to generate a residual, and wherein successive residuals are tested with a statistical hypothesis test for a determination at least in part of the presence of a fault in the performance of said system.

10. A method for monitoring a system instrumented with one or more sensors that measure a plurality of variables characterizing performance of the system, comprising the steps of:

acquiring a current observation of the plurality of variables;

generating an estimate of an expected value for at least one of said plurality of variables;

comparing at least one said estimate to its corresponding measured variable; and storing in computer-readable form in a memory device an indication of the performance of said system based at least in part on a result of the comparing step;

wherein said step of generating an estimate comprises:

providing a reference set of observations characteristic of expected performance of said system, each such reference set observation comprising at least a subset of the plurality of variables;

selecting from said reference set a subset of observations that have a similarity to the acquired current observation above a specified threshold;

forming a model set of observations from the selected subset of observations;

computing said estimate using the acquired current observation and the model set of observations in a similarity-based model; and repeating these steps for generating an estimate for at least some of subsequently acquired current observations.

11. A method according to claim 10 wherein said step of computing said estimate in a similarity based-model utilizes a similarity operation wherein like elements of two observations are differenced, the absolute value of the difference is divided by an expected range for the element, and the resulting quantity is subtracted from 1; and the similarity of the two observations is determined as the average of all such similarities determined for elements of the two observations.

12. A method according to claim 10 wherein said step of computing said estimate in a similarity based-model utilizes a similarity operation wherein the norm of the difference of two observations is added to 1; and the result thereof is inverted.

13. A method according to claim 10 wherein said step of selecting from said reference set a subset of observations that have a similarity to the acquired current observation above a specified threshold comprises generating a similarity value between a reference set observation and the acquired current observation, using only a subset of the corresponding elements of the two observations.

14. A method according to claim 10 wherein said step of computing said estimate in a similarity based-model comprises using as input to the similarity-based model a modified form of the acquired current observation wherein an element corresponding to at least one of the plurality of variables is removed, and the removed variable is estimated by the similarity-based model.

15. A method according to claim 10 wherein said step of comparing at least one said estimate to its corresponding measured variable comprises differencing the estimate and its corresponding measured variable to generate a residual that is compared to a threshold for a determination at least in part of the presence of a fault in the performance of said system.

16. A method according to claim 10 wherein said step of comparing at least one said estimate to its corresponding measured variable comprises differencing the estimate and its corresponding measured variable to generate a residual, and wherein successive residuals are tested with a statistical hypothesis test for a determination at least in part of the presence of a fault in the performance of said system.

17. An apparatus for monitoring a system instrumented with one or more sensors that measure a plurality of variables characterizing performance of the system, comprising:

means for acquiring a current observation of the plurality of variables;

a memory for storing a reference set of observations characteristic of expected performance of said system, each such reference set observation comprising at least a subset of the plurality of variables;

a processor-executed module for selecting a subset of said reference set of observations having sufficient similarity to the acquired current observation and forming a model set of observations from the selected subset of observations;

a processor-executed module for generating an estimate of an expected value for at least one of said plurality of variables using the acquired current observation and the model set of observations in a similarity-based model;

a processor-executed module for comparing at least one said estimate to its corresponding measured variable to form a residual and determining an indication of the performance of said system based at least in part thereon; and a processor-executed module for examining the acquired current observation and for augmenting the reference set of observations stored in said memory with the data of the acquired current observation when at least one value from the acquired current observation is outside of a specified range, by adding the acquired current observation to the reference set of observations.

18. An apparatus according to claim 17 wherein said processor-executed module for selecting a subset of said reference set selects a specified number of reference set observations to constitute the model set, that have the highest similarity to the acquired current observation.

19. An apparatus according to claim 17 wherein said processor-executed module for selecting a subset of said reference set selects those reference set observations to constitute the model set, that have a similarity to the acquired current observation above a specified threshold.

20. An apparatus according to claim 17 wherein said processor-executed module for augmenting the reference set of observations examines further removes an observation from the reference set of observations upon adding the acquired current observation.

21. An apparatus according to claim 17 wherein said a processor-executed module for comparing at least one said estimate to its corresponding measured variable further comprises a diagnostic module for examining patterns of residuals formed from differencing estimates and corresponding measured variables for at least a subset of the plurality of variables, and determines a presence of a failure mode of said system as an indication of the performance of said system.

22. A apparatus according to claim 17 wherein said processor-executed module for selecting a subset of said reference set uses a similarity value between a reference set observation and the acquired current observation, using only a subset of the corresponding elements of the two observations.

23. An apparatus according to claim 17 wherein said processor-executed module for generating an estimate of an expected value for at least one of said plurality of variables computes said estimate in a similarity based-model using as input to the similarity-based model a modified form of the acquired current observation wherein an element corresponding to at least one of the plurality of variables is removed, and the removed variable is estimated by the similarity-based model.

24. An apparatus according to claim 17 further comprising a processor-executed module for rendering a web browser viewable display of at least one of the set of said estimate, said residual and said indication of the performance of said system.

25. An apparatus according to claim 17 further comprising a processor-executed module for making accessible to other software programs at least one of the set of said estimate, said residual and said indication of the performance of said system.

* * * * *